(No Model.)

W. T. DRAKE & F. C. HEFFRON.
COMPOSITOR'S PAY MEASURE.

No. 509,073. Patented Nov. 21, 1893.

Witnesses
G. E. Purple
F. S. Lyon

Inventors
William T. Drake
Frederic C. Heffron
By Paul & Merwin Attys

UNITED STATES PATENT OFFICE.

WILLIAM T. DRAKE AND FREDERIC C. HEFFRON, OF MINNEAPOLIS, MINNESOTA.

COMPOSITOR'S PAY-MEASURE.

SPECIFICATION forming part of Letters Patent No. 509,073, dated November 21, 1893.

Application filed February 24, 1893. Serial No. 463,544. (No model.)

*To all whom it may concern:*

Be it known that we, WILLIAM T. DRAKE and FREDERIC C. HEFFRON, of Minneapolis, county of Hennepin, State of Minnesota, have invented certain new and useful Improvements in Compositors' Pay-Measures, of which the following is a specification.

Our invention relates to a measure for ascertaining the amount to be paid to a compositor for his day's work; and further to means for compacting the string of composition and for showing up on the same measure or string all the composition or dupes, whether in minion, nonpareil or agate type or all such types.

The object of the invention is to provide means whereby a compositor may prepare his dupes for the inspection of the foreman and book-keeper, and in such a manner that he himself may without figuring ascertain the exact amount to which he is entitled; and further so arrange the dupes that they may be conveniently filed away for reference.

To this end our invention consists in general, in a scale marked in dollars and cents and of a length equal to that of a string of the size which is required to be set for a dollar or other unit.

The invention further consists in one or more extensions of the scale whereon a series of dupes may be secured and measured and whereby work to the amount of several dollars and cents may be shown.

The invention further consists in a series of such scales of different sizes, arranged upon a single sheet whereby the work of one compositor upon all kinds of dupes in use during the day will be shown.

The invention will be more readily understood by reference to the accompanying drawings, forming part of this specification, in which—

Figure 1:
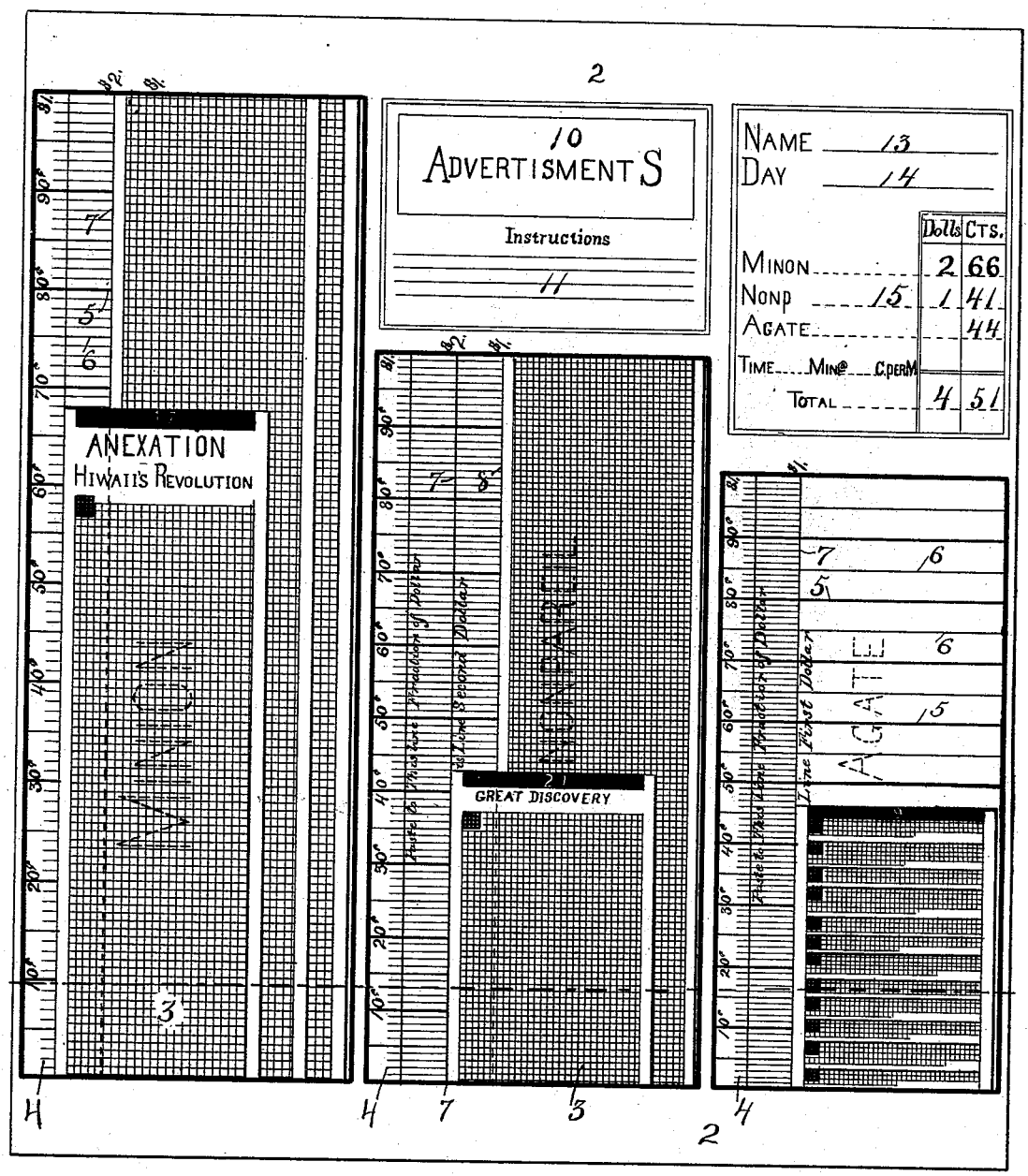
Figure 2:

Figure 1 shows a measuring pay sheet embodying our invention. Fig. 2 is a sectional view thereof.

As shown in the drawings, 2 represents a substantially square sheet upon which the dupes 3 are pasted. The sheet is preferably divided into three parts for scales and spaces corresponding to three kinds of type, say minion, nonpareil and agate. The minion scale is of course the longest and is placed at the left hand of the sheet, the others following in order.

In each printing office a certain scale of wages is established. The scale price ranges from thirty-five cents to fifty cents for the area occupied by one thousand ems and is made of such length as to take in a dollar's worth of work at a given rate. The measure will therefore have to be adjusted to the rate of wages in each printing office as the intention is to furnish a direct reading price or pay scale, which, after the proportionate length has been fixed once will thereafter be used by the compositor without regard on his part to the number of ems in the dupe. It will be seen, therefore, that area and price are practically the only elements entering into our invention. This being the case the measures for the smaller type will be shorter as the same number of type will be contained in a smaller area. The measure 4 is graduated in cents, 10c., 20c., 30c., and so on up to a dollar with intermediate cent marks. The graduations or marks preferably extend across the vertical columns 5 and 6, which are separated by lines 7 and 8. To the right of these columns is a wide space equal in breadth to a dupe or stick copy. A compositor begins by sticking his dupes in the wide column, placing the edges on the line 8. After the wide column has been filled the next column is begun on the second dollar column, the dupes being pasted within the narrow column only and brought up to the line 7. After the second dollar column has been filled the narrow column next to the price scale is filled or partly so. Assuming that the top line of the dupe in the last column comes opposite the 66c. mark on the scale, it will be seen that in the above case two dollars and sixty-six cents would be indicated as the price to be paid for the work. As shown in the drawings, work to the extent of two dollars and sixty-five cents in minion, one dollar and forty-one cents in nonpareil and forty-four cents in agate is indicated; making a total of four dollars and fifty cents on all kinds of type. This card being handed to the book-keeper instantly shows the amount to be credited to the compositor and may, owing to its popular size and general compactness, due to the overlapping of the several columns of dupes, be readily and conveniently stored away for future reference. Above the middle scale we provide spaces 10 and 11 for the advertisement and for instructions. Above the right hand scale a larger space is left owing to the shortness of the scale, and in this space we provide name and date lines 13 and 14, and below the same type name lines and total columns 15.

Having thus described our invention, we claim as new and desire to secure by Letters Patent—

1. A compositor's pay measure, consisting in a strip having upon it graduations of fractions of a given unit of money; the length of a unit being that of a string containing the composition area required to be set for such amount.

2. A compositor's pay measure and record, consisting of a wide strip having upon it a graduated scale, graduated in the fractions of a given unit of money, the length of said unit being equal to that of a string containing the composition area required to be set for such amount, and one or more narrow columns adjoining said graduations and whereon the dupes are adapted to be pasted in rows or columns overlapping one another, substantially as described.

3. A compositor's pay measure and record, consisting of a wide strip having upon it a graduated scale, graduated in the fractions of a given unit of money, the length of said unit being equal to that of a string containing the composition area required to be set for such amount, and one or more narrow columns adjoining said graduations and whereon the dupes are adapted to be pasted in rows or columns overlapping one another, and said strip or sheet being provided with two or more sets of said graduations and columns, the several sets corresponding to the type used in the strips to be pasted thereon, substantially as described.

4. A compositor's pay measure and record, consisting of a wide strip having upon it a graduated scale, graduated in the fractions of a given unit of money, the length of said unit being equal to that of a string containing the composition area required to be set for such amount, and one or more narrow columns adjoining said graduations and whereon the dupes are adapted to be pasted in rows or columns overlapping one another, and said strip or sheet being provided with two or more sets of said graduations and columns, the several sets corresponding to the type used in the strips to be pasted thereon, said sheet also provided with extra spaces for the name, date, instructions and the totals in dollars and cents, substantially as described.

In testimony whereof, we have hereunto set our hands this 15th day of February, 1893.

WILLIAM T. DRAKE.
FREDERIC C. HEFFRON.

In presence of—
C. G. HAWLEY,
F. S. LYON.